June 10, 1930.　　C. S. SORENSEN　　1,762,534
POWER TRANSMISSION
Filed May 17, 1927　　4 Sheets-Sheet 1
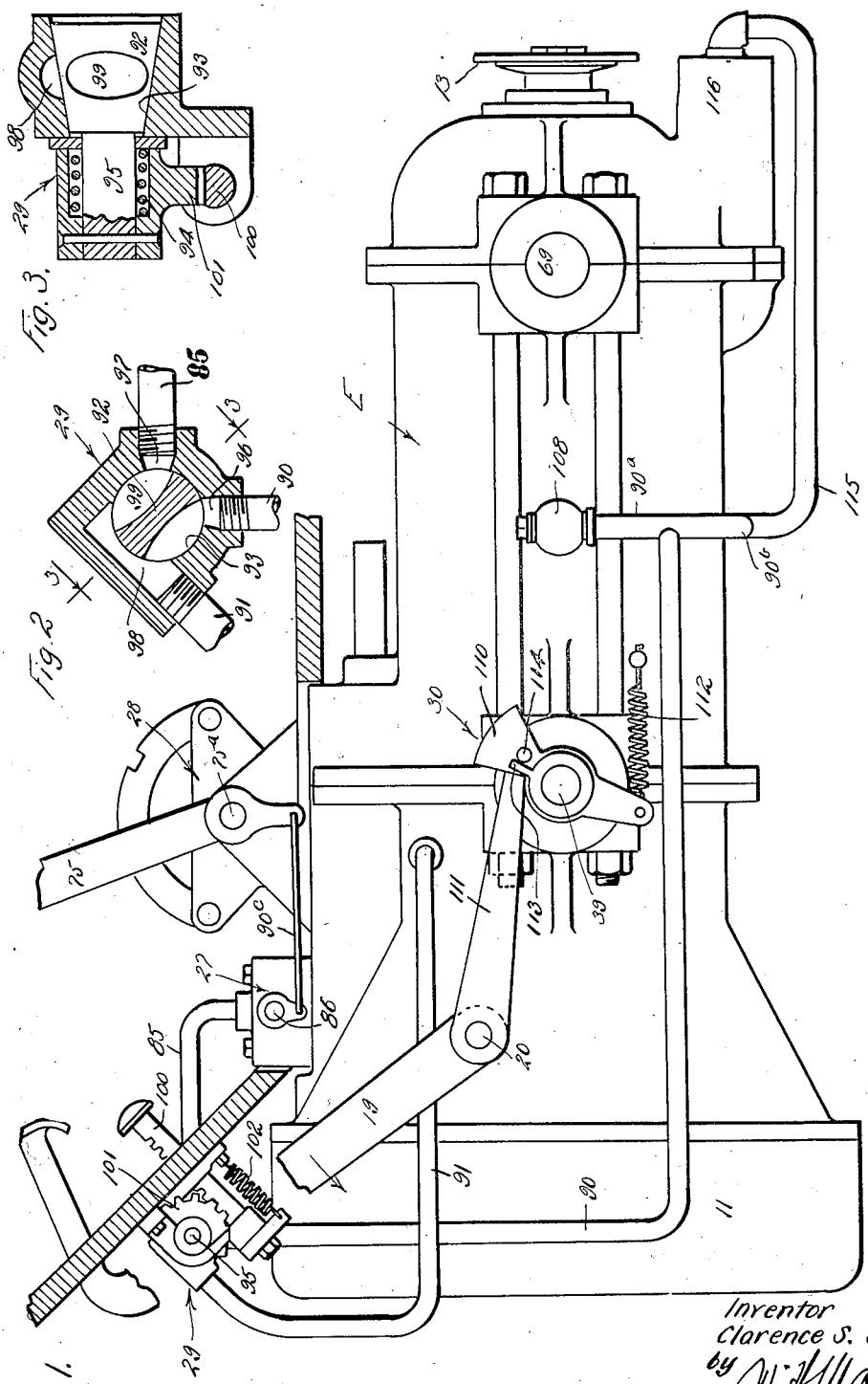
Inventor
Clarence S. Sorensen
by /N. H. Maxwell/
his Attorney

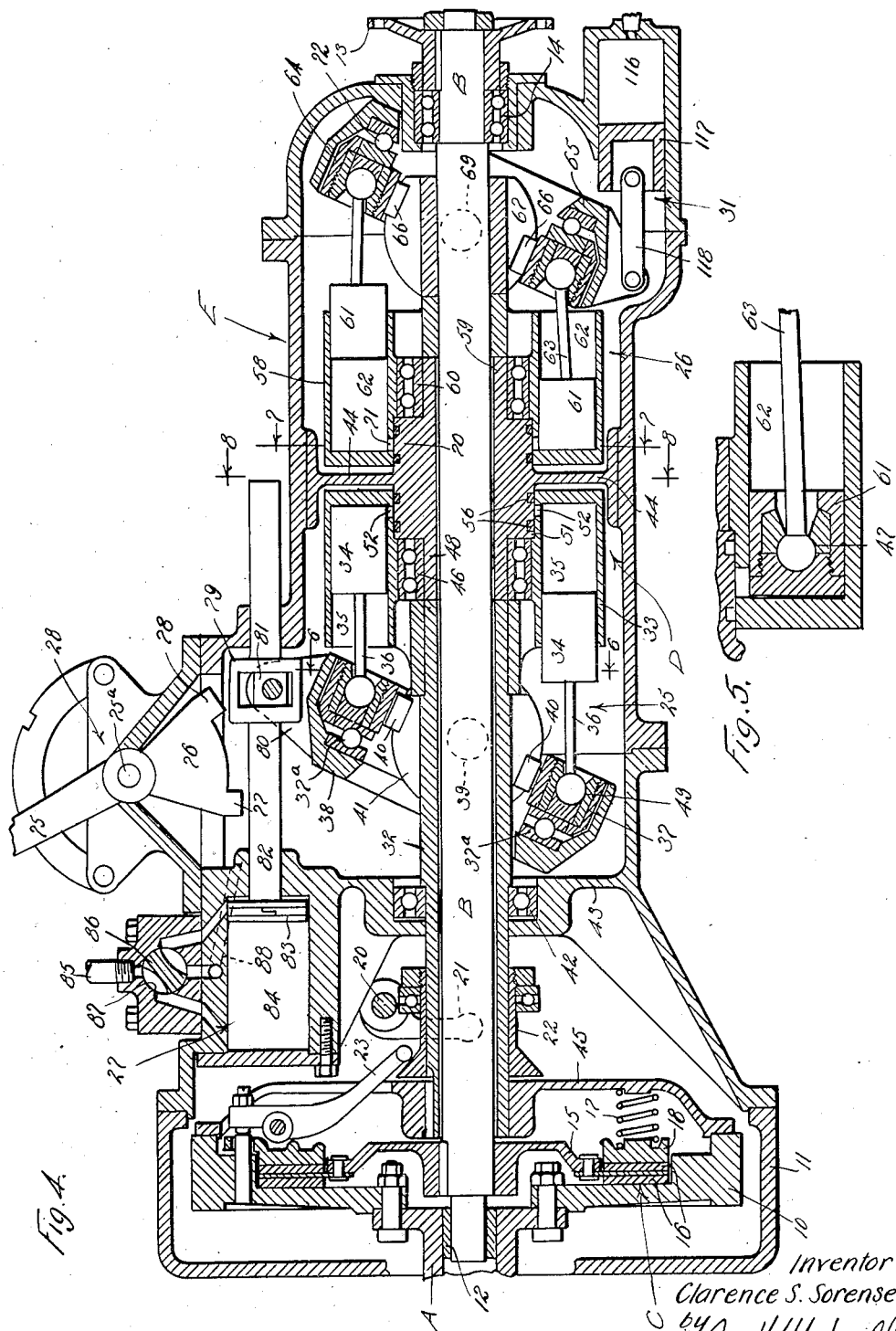

June 10, 1930.　　C. S. SORENSEN　　1,762,534
POWER TRANSMISSION
Filed May 17, 1927　　4 Sheets-Sheet 3
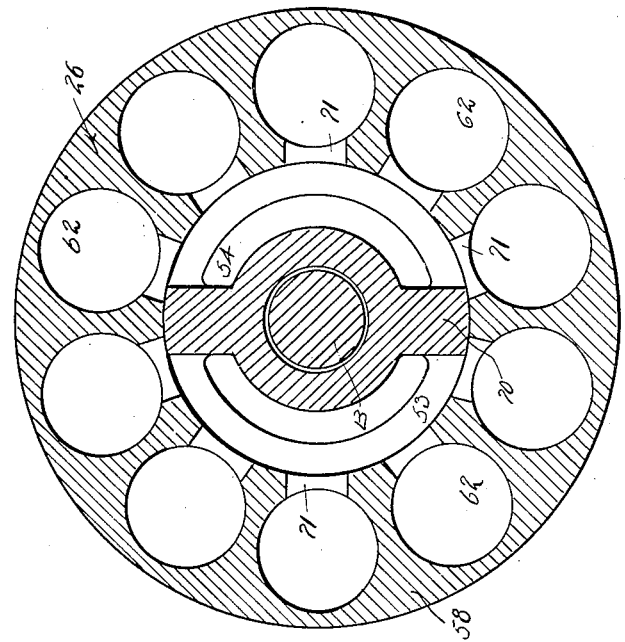
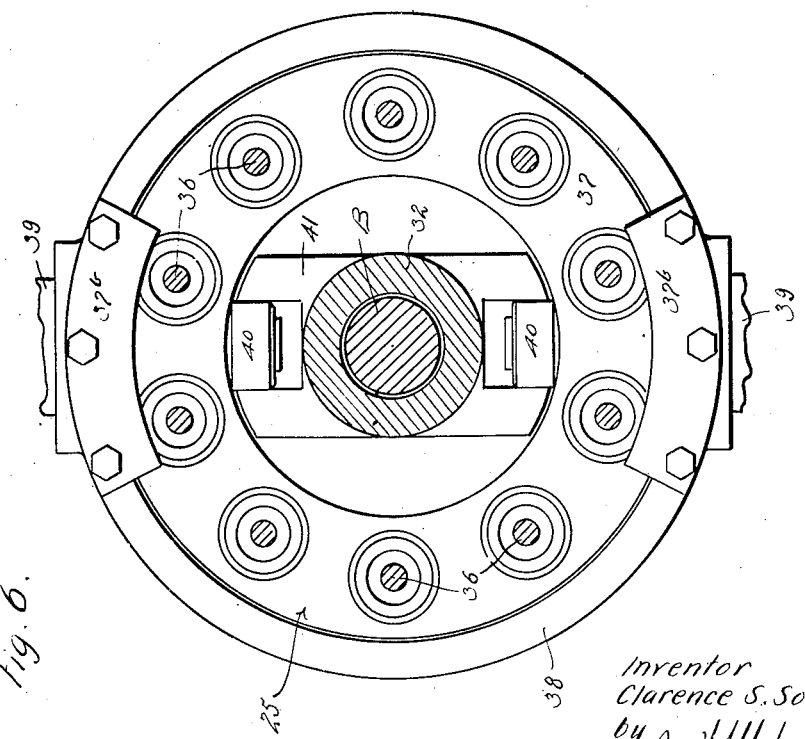
Inventor
Clarence S. Sorensen
by
his Attorney June 10, 1930.  C. S. SORENSEN  1,762,534
POWER TRANSMISSION
Filed May 17, 1927  4 Sheets-Sheet 4

Inventor
Clarence S. Sorensen
by
His Attorney.

Patented June 10, 1930

1,762,534

UNITED STATES PATENT OFFICE

CLARENCE S. SORENSEN, OF LOS ANGELES, CALIFORNIA

POWER TRANSMISSION

Application filed May 17, 1927. Serial No. 191,975.

This invention has to do with a power transmission, and it is a general object of the invention to provide a variable speed power transmission of a type particularly useful in motor vehicles and in other apparatus presenting or involving the general conditions encountered in the drive of motor vehicles, and the like.

The invention is useful, generally, as a power transmission where a variable speed drive is desired; however, for purpose of example, I will disclose a form of the invention designed particularly for use in a motor vehicle such as a motor car or bus, and will refer to the invention in such connection, it being understood that this reference is not to be construed in any way as a limitation or restriction upon the broader principles of the invention.

It is a primary object of this invention to provide a power transmission including, in combination, a variable speed hydraulic drive, and a positive or mechanical drive adapted to be put into operation upon the drive and driven members being brought to the desired speed ratio through the hydraulic drive.

Another object of the invention is to provide a power transmission embodying a variable speed hydraulic drive, a releasable clutch drive, and a control whereby the clutch is automatically engaged or closed upon a predetermined speed ratio being obtained between the drive and driven members.

Another object of the invention is to provide a transmission of the character mentioned whereby the driven member can be operated in either direction from the drive member.

It is a further object of this invention to provide a variable speed hydraulic drive operable to automatically vary the speed ratio between the drive and driven members according to the load or resistance of the driven member.

It is another object of this invention to provide a transmission of the character mentioned wherein the hydraulic means is out of operation or allowed to idle without operation when the clutch drive is engaged.

It is a further object of this invention to provide various improvements in the arrangement and construction of parts for a transmission of the character mentioned.

The various objects and features of the invention will be best and more fully understood from the following detailed description of a typical form and application of the invention, throughout which description reference is had to the accompanying drawings, in which:

Fig. 1 is a side elevation of a typical power transmission embodying the present invention;

Fig. 2 is an enlarged, transverse, sectional view of the throttle valve;

Fig. 3 is a sectional view of the valve shown in Fig. 2, being a view taken as indicated by line 3—3 on Fig. 2;

Fig. 4 is a longitudinal, detailed, sectional view of the mechanism provided by this invention, showing the parts of the hydraulic drive in position to cause the drive and driven members to be operated at the same speed and showing the mechanical clutch engaged to directly connect the drive and driven members to operate at the same speed;

Fig. 5 is an enlarged, sectional view showing one of the cylinders and pistons of the hydraulic drive;

Fig. 6 is a detailed, transverse, sectional view of the hydraulic drive, being a view taken substantially as indicated by line 6—6 on Fig. 4;

Fig. 7 is a sectional view, taken as indicated by line 7—7 on Fig. 4; and

Figure 8:
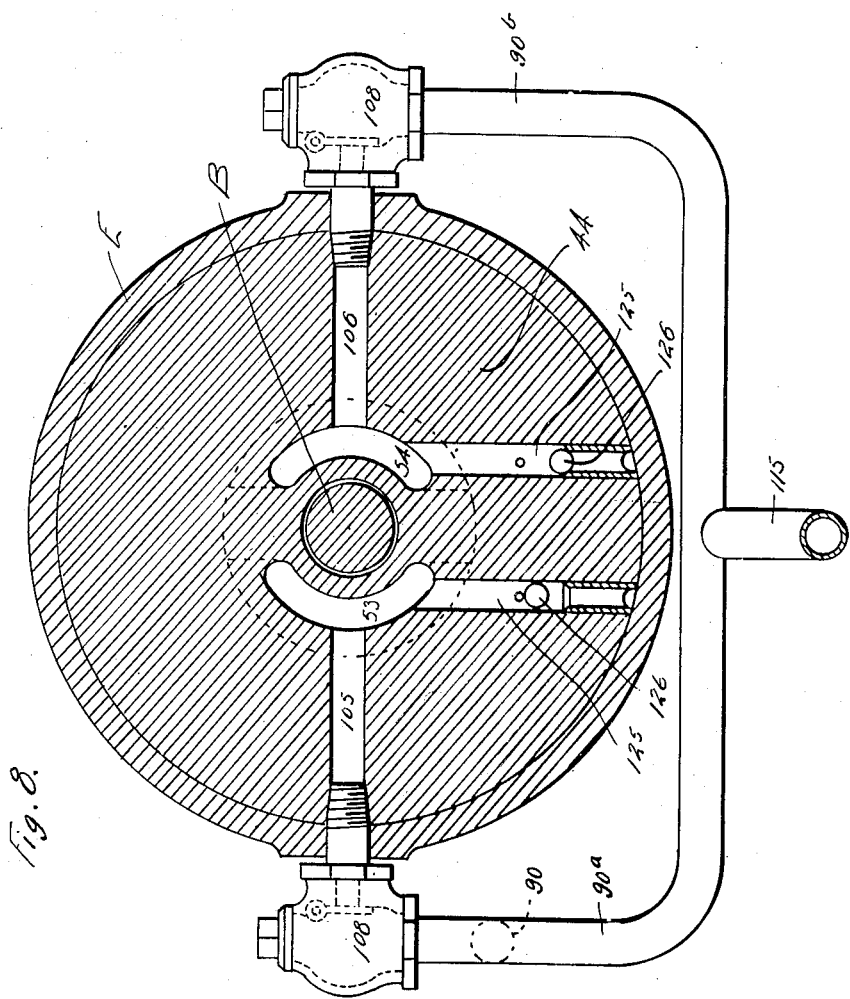
Fig. 8 is a sectional view, taken as indicated by line 8—8 on Fig. 4.

The mechanism provided by this invention includes, generally, a drive shaft A, a driven shaft B, a clutch C for directly connecting the shafts A and B, a variable speed hydraulic drive D for providing a variable speed drive between the shafts A and B capable of bringing the speed of the driven shaft to that of the drive shaft, a housing E for the various parts of the mechanism, and various other parts, the details and functions of which will be hereinafter set forth.

The drive shaft A, as disclosed in the drawings, is an engine shaft provided with a suitable flywheel 10. In the particular case illustrated in the drawings, the shaft A is that of a typical internal combustion engine of the type used in motor vehicles, and the flywheel 10 on the end of the drive shaft is surrounded by a suitable housing 11.

The driven shaft B is arranged in the housing E concentric with the shaft A and is mounted for rotation in suitable bearings. In the arrangement shown in the drawings, the inner end of the driven shaft B is rotatably mounted in a bearing 12 provided in the end of the drive shaft A, while the outer end of the driven shaft projects from the outer end of the housing E and is provided with a coupling flange 13. The outer end portion of the driven shaft is supported by the housing E through a suitable bearing construction 14.

The clutch C provided for making a direct drive connection between the drive shaft A and the driven shaft B is preferably a mechanical clutch, for instance, a friction clutch. In the drawings, I have disclosed a typical form of mechanical clutch, that is, a friction clutch of the type found in automobile construction. This particular clutch includes a driven element 15 fixed on the driven shaft B to be connected with the flywheel 10 on the drive shaft A through friction members 16. The friction members are normally held in position to hold the member 15 through the action of springs 17. The springs 17 act on a pressure ring 18 which operates to press or hold the driven element 15 and friction members 16 together and to the flywheel.

The control or operating means for the mechanical or direct drive clutch C includes, generally, an operating lever 19 in the form of a foot lever, a shaft 20 operated by the lever 19 and extending into one side of the housing E, arms 21 on the shaft 20 within the housing to operate a sleeve 22 movable longitudinally in the housing, and arms 23 operated by the sleeve 22 to move the pressure ring 18. When the foot lever 19 is depressed or moved in the direction indicated by the arrow in Fig. 1, the shaft 20 is rotated causing arms 21 to move the sleeve 22 so that the arms 23 move the ring 18 against the pressure of the springs 17 to release the driven element 15.

The variable speed hydraulic drive D provided between the shafts A and B includes, generally, a pressure generating unit 25 operated by the drive shaft A, a pressure operated driving unit 26 operated by the pressure from the unit 25 and connected to drive the shaft B, a power reverse 27 for the pressure generating unit 25, control means 28 for the power reverse 27, a throttle valve 29 for regulating the operation of the hydraulic drive, automatic control means 30 between the hydraulic drive and the mechanical clutch whereby the clutch is automatically engaged or closed when the hydraulic drive has operated to bring the shaft B to the same speed as the shaft A, and means 31 for moving the carrier of unit 26 to a tilted position when the hydraulic drive is put in operation.

The pressure generating unit 25 includes, generally, a drive sleeve 32 directly and positively driven from the shaft A, a cylinder block 33 surrounding and fixed to the sleeve 32, pistons 34 fitted in the cylinders 35 formed in the block 33, connecting rods 36 connecting the pistons with a drive ring 37 surrounding the sleeve 32, a carrier 38 for the drive ring whereby the ring may be supported in various tilted or inclined positions, trunnions 39 extending from diametrically opposite sides of the carrier 38 to support it in the housing E, rollers 40 on the inside of the drive ring 37, and a drive block 41 on the sleeve 32 holding the rollers.

The drive sleeve 32 is rotatably supported in the housing E through a bearing 42 carried by a partition 43 at the inner end portion of the housing. The sleeve 32 extends over or surrounds the driven shaft B with working clearance, and is fixed to or operatively connected with the drive shaft A through a plate 45 fixed on the sleeve and secured to the flywheel 10 on the drive shaft A.

The cylinder block 33 is annular in form and is keyed or otherwise secured on the drive sleeve 32 so that it is concentric with the longitudinal axis of the mechanism. The cylinder block 33 is arranged at one side of a central partition 44 provided in the housing E. A central extension 48 is provided on the partition 44 to extend into the cylinder block and carry a bearing 46 which rotatably supports the cylinder block. The cylinders 35 are formed in the block 33 from its outer end and are arranged symmetrically around the block in the manner shown in Fig. 7 of the drawings. The pistons 34 are mounted for reciprocation in the cylinders 35. The connecting rods 36 are swively connected with the pistons 34 through ball and socket connections 47 and are swively connected with the drive ring 37 through ball and socket connections 49. The details of these connections are illustrated in Figs. 4 and 5 of the drawings. The ring 37 is rotatably mounted in the tiltable carrier 38 through a suitable bearing 37ª and is connected with the drive sleeve 32 to rotate with it. The drive between the sleeve and ring includes the rollers 40 mounted in the ring 37 at diametrically opposite points and the drive block 41, which is fixed on the sleeve 32 and is provided with slots or openings carrying the rollers. The drive ring may be retained in the carrier by suitable retaining members 37b, shown in Fig. 6 of the drawings.

The inner end of the opening through the cylinder block 33 is finished to fit and rotate on the finished portion 51 of the extension projecting from the central partition 44. Ports 52 connect the inner ends of the cylinder 35 with the finished inner end portion of the cylinder block to co-operate with ports 53 and 54 provided in the portion 51 of the extension. Packing rings 56 are provided between the part 51 and the bearing block adjacent the ports 53 and 54. The ports 53 and 54 are diametrically opposite each other in the part 51 and each extends circumferentially substantially half way around the part 51, as shown in Fig. 7 of the drawings. With this arrangement, the port 52, in connection with each cylinder, is in communication with the port 53 during about one-half of each revolution of the cylinder block and is in communication with the port 54 during about the other half of the revolution.

The pressure operated driving unit 26 may be substantially the same in construction and general arrangement of parts as the pressure generating unit 25. In the drawings, I have disclosed the unit 26 arranged in the housing so that the central partition 44 is between the units. The unit 26 has its various parts faced opposite to the corresponding parts of the unit 25. The unit 26, as shown in the drawings, includes a cylinder block 58 mounted on an extension 59 of the partition 44 through a suitable bearing 60, pistons 61 mounted for operation in cylinders 62 formed in the cylinder block, connecting rods 63 connecting the pistons 61 with a driven ring 64, a tilting carrier 65 for the driven ring, rollers 66 carried by the driven ring to operate in openings in a block 67 provided on the driven shaft B, and trunnions 69 mounting the carrier 65 in the housing E for the desired tilting movement. The inner end portion of the opening in the cylinder block 58 is finished to slidably fit a part 70 of the extension 59. The ports 53 and 54, provided in the finished part 51 at the generating unit 25, extend through the partition 44 and open at the part 70 to co-operate with ports 71 formed in the cylinder block to connect into the inner ends of the cylinders 62. The driven ring 64, connected with the pistons 61 through the connecting rods 63, is mounted for rotation in the carrier 65 through a suitable bearing 72. The rollers 66 are provided diametrically opposite each other on the interior of the ring 64 and operate in the openings provided in the driven block 67 which is fixed on the driven shaft B.

This provides a driving connection between the ring 64 and the driven shaft B.

In operation, the means 25 operates to generate pressure to cause operation of the means 26. Pressure is developed by the means 25 when the carrier 38 is tilted to an angular position so that the pistons 34 are caused to reciprocate in the cylinders 35 as the cylinder block 33 and drive ring 37 are driven or rotated with the sleeve 32. The mounting trunnions 39 of the carrier 38 and the ports 53 and 54 extending through the central partition 44 are related so that tilting of the carrier 38 in one direction causes fluid to be drawn into the cylinders 35 from the port 54 during about one-half a revolution of the mechanism and to be forced from the cylinders into the port 53 during the other half revolution of the mechanism, while tilting of the carrier in the opposite direction causes fluid to be drawn into the cylinders 35 from the port 53 and forced from the cylinders through the port 54. Thus, it will be obvious that the tilting of the carrier 38 determines the direction of the flow of fluid in the ports 53 and 54. Further, it will be obvious that the quantity of fluid pumped by the unit will depend upon the angularity of the carrier 38, as the angularity of the carrier obviously controls the stroke of the pistons. The unit 26, being in direct connection with the unit 25 through the ports 53 and 54, is operated by the fluid pumped by the unit 25. With the carrier 65 tilted as shown in Fig. 4 of the drawings, fluid pumped through port 53 will cause the shaft B to rotate in one direction, while fluid pumped through port 54 will cause the shaft B to rotate in the opposite direction.

In accordance with my invention, I provide means whereby the units 25 and 26 are kept supplied with fluid from the interior of the housing E. In practice, oil is used in the mechanism. Supply ports 125 are provided in the partition 44 connecting the ports 53 and 54 with the interior of the housing, and check valves 126 are provided in the ports 125 to allow fluid to enter the ports 53 and 54 from the housing but prevent fluid from passing out through the ports 125 into the housing.

The above described pressure generating unit 25 and the pressure operated driving unit 26 constitute, generally, typical means that may be employed in carrying out my invention, it being understood, however, that other forms of pressure generating means and other forms of pressure operated driving means may be used in carrying out the invention. The particular means disclosed are known to be practical and effective for the work required in the present mechanism.

The carrier 38 of the pressure generating unit is tilted in the desired direction and to the desired degree through the power reverse 27 and the control means 28. The control means 28 includes an operating lever, for instance, a hand lever 75, or the like, mounted at the exterior of the housing E on a shaft 75ª, and arm 76 on the shaft 75ª within the housing E, and spaced stop lugs 77 and 78 on the arm 76 adapted to stop or limit the movement of a cross head 79 which is connected with the carrier 38 through an extension 80 on the carrier, and a block 81 slidably carried in the crosshead. The hand lever 75 may be positioned so that the stop 77 is at one side of the cross head and allows the crosshead to move in one direction only from its unactuated position, or it can be positioned so that the stop 78 is at the other side of the cross head and allows the cross head to move only in the other direction from the unactuated position. In practice, and for purposes which will be understood from the following description, the stops 77 and 78 are preferably proportioned with reference to the cross head 79 so that they operate to stop the cross head in position so that the carrier 38 is tilted slightly when in the normal or unactuated position, keeping the pressure generating unit in operation sufficient to maintain circulation through the throttle valve. For instance, in practice, the stops 77 and 78 may be located to normally stop the crosshead with the carrier tilted about five degrees in either direction from the untilted position.

The crosshead 79, above referred to, is carried on a piston rod 82, which carries the piston 83 of the power reverse 27. The piston 83 operates in a cylinder 84. The power reverse includes, in addition to the cylinder and piston mechanism, a control valve whereby fluid may be admitted from the throttle valve 29 to either end of the cylinder 84, while the other end of the cylinder is opened to allow fluid to discharge into the housing E. I have shown a control valve of simple construction, including a rotating valve member 86 operating in a cylinder 87. The cylinder 87 has spaced ports connected with the ends of the cylinder 84 and has spaced ports, one connected with the throttle valve by a pipe 85 and the other with a discharge passage 88. The valve 86 controls communication between the ports so that pressure can be admitted to either end of the cylinder 84 from the pipe 85 at the same time that the other end of the cylinder 84 is open to allow fluid to exhaust or discharge from it into the housing E. By thus controlling the admission of fluid to the cylinder 84, the positioning of the piston 83 in the cylinder 84 can be controlled and the cross head 79, being connected with the piston 83 by the rod 82, can be operated to any desired position. When the piston 83 is at one end of the cylinder 84, the cross head holds the carrier 38 in one extreme tilted position, and when the piston 83 is at the other end of the cylinder 84, the cross head holds the carrier in the opposite extreme tilted position.

In accordance with my invention, I provide a link connection 90ᶜ between the lever 75 and the valve 86 so that the valve makes the proper connection between the pressure supply pipe 85 and the cylinder 84 to correspond to the stop which is operative to limit the movement of the cross head. For instance, the link connection is provided between the lever 75 and the valve 86 so that pressure is admitted to one end of the cylinder 84 when the stop 77 is in active position and is admitted to the opposite end of the cylinder 84 when the stop 78 is in operative position.

The throttle valve 29 is provided to regulate the fluid admitted to the pipe 85 so that the piston 83 can be operated to the desired positon in the cylinder, thus causing the cross head 79 to assume the desired position and to hold the carrier 38 in the desired tilted position. The throttle valve is supplied with fluid under pressure from the pressure generating unit through a pressure supply pipe 90 and is operable to direct the fluid from the supply pipe 90 into the pipe 85 to operate the piston 83, or into a return pipe 91 which conducts it into the housing E.

The throttle valve 29 illustrated in the drawings is of the rotary type and includes a rotating valve member 92 operating in the cylinder 93. The valve 92 and cylinder 93 are tapered to fit tightly together, as shown in Fig. 3, and are normally held in the proper seated relation through the action of a spring 94 acting on a stem 95 provided on the valve 92. The cylinder 93 is provided with spaced ports 96, 97 and 98. The pressure supply pipe 90 connects with the port 96, the pipe 85 extending to the power reverse connects with the port 97, while the return pipe 91 connects with the port 98. The valve 92 is provided with openings 99 to co-operate with the ports in the cylinder so that all of the fluid delivered by supply pipe 90 can be by-passed to the port 98 to discharge through the return pipe 91, or communication can be opened between the ports 96 and 97 so that fluid from the supply pipe 90 is passed to the pipe 85. The valve 92 is adapted to be operated or rotated through a suitable operating member 100. In the drawings, I have shown a rack 100 arranged to be depressed by the operator's foot and a gear segment 101 operatively connecting the rack with the stem 95 of the valve. A spring 102 is arranged in connection with the rack 100 to normally hold it in an unactuated position where the valve 92 is positioned as shown in Fig. 2 so that fluid from the supply pipe is by-passed to the return pipe.

Fluid under pressure is supplied to the pressure supply pipe 90 from the ports 53 and 54. In the arrangement shown in the drawings, a port 105 extends from the exterior of the housing through the central partition 44 to the port 53 and a port 106 extends from the exterior of the housing through the central partition 44 to the port 54. The pressure supply pipe 90 has branches 90$^a$ and 90$^b$ connected with the ports 105 and 106, respectively, as shown in Fig. 8 of the drawings. Check valves 108 are provided in the branches 90$^a$ and 90$^b$ of the pressure supply pipe to allow fluid to enter the pressure supply pipe from the ports 105 and 106 and prevent return of fluid from the pressure supply pipe to the ports 105 and 106. With this arrangement, fluid under pressure is delivered to either one or the other of the branch pipes 90$^a$ or 90$^b$ so long as pressure is being developed by the unit 25.

My invention provides means to operate the carrier of the unit 26 to the tilted position as the hydraulic drive is put in operation. The pressure supply pipe 90 has a branch 115 extending to a cylinder 116 carrying a piston 117 connected to the carrier 65 through a connecting rod 118. When the throttle valve 29 is operated to prevent by-passing of the fluid from the pipe 90 to the return pipe 91, pressure developes in the cylinder 116, causing operation of the piston 117 so that the carrier 65 is moved to the tilted position, as shown in Fig. 4.

In the operation of the mechanism, the carrier of the pressure generating unit is tilted slightly so that pressure develops in the driving unit 26 causing the carrier 65 of the driving unit to tilt to the position shown in Fig. 4. The carrier 65 of the unit 26 will tilt to its extreme tilted position as soon as the operation is started, giving the pistons 61 their maximum or full stroke in the cylinders 62. With the carrier 38 tilted only slightly, the pistons 34 are operated through short strokes in the cylinders 35 and, therefore, the fluid pumped by the unit 25 operates the unit 26 at a speed considerably less than the speed at which the unit 25 is driven. As the angularity or tilt of the carrier 38 is increased, the unit 26 increases in speed until the carrier 38 is tilted to the same degree as the carrier 65, at which time the drive and driven units operate at the same speed. Under this condition, the drive and driven shafts are operating at the same speed. In accordance with this invention, the automatic control means 30 operates to automatically close or engage the clutch C upon the speed of the driven shaft reaching that of the drive shaft. This automatic control means includes a lug 110 mounted on one of the trunnions 39 of the carrier 38 to co-operate with an arm 111 carried on the shaft 20 of the clutch control means. In the particular arrangement shown in the drawings, the means 30 is designed to automatically engage the clutch C only when the driven shaft is being operated in the forward direction. In this case, the lug 110 is rotatably mounted on the trunnion 39 and is normally urged by means of a spring 112 to position to engage under the arm 111. A projection 113 is fixed on the trunnion 39 to co-operate with a pin 114 extending from one side of the lug 110 to turn or operate the lug 110 against the resistance of the spring 112 as the trunnion 39 rotates during tilting of the carrier 38 in the direction causing forward operation of the driven shaft B. The lug 110 is related to the arm 111 so that it holds the arm 111 in an up position where the shaft 20 holds the clutch mechanism released until the trunnion 39 has rotated to a position where the carrier 38 is in the full tilted position and the unit 26 is operated at the same speed as the unit 25, at which time the lug passes from under the arm 111, allowing the arm to drop to the position shown in Fig. 1, causing engagement of the clutch C. When the clutch C has thus automatically engaged, the shafts A and B are, of course, connected to be directly driven through the clutch C. Under this condition, the resistance or load is removed from the driven unit 26 and the units 25 and 26 are operated from shafts A and B at the same speed so that the carriers 38 and 65 of the units automatically return from the tilted positions to the normal unactuated positions through the action of centrifugal force. When the carriers are in the unactuated position, the drive and driven units rotate bodily but without operation of the pistons in the cylinders. The amount of energy required to operate the pistons 34 in the cylinders 35 to maintain circulation in the mechanism is so slight as to be practically negligible.

From the foregoing description, it is believed that the operation of each unit or element of the mechanism will be understood and that the general scheme of operation will be obvious. When the mechanism is out of operation, the clutch C is released, the clutch pedal 19 being depressed. The clutch is held in this position through engagement of the lug 110 under the arm 111 connected with the clutch shaft 20. If the drive shaft A is then put in operation, the pressure generating unit 25 is rotated and the slight tilting of the carrier 38, when in the unactuated position, causes fluid to circulate through the by-pass of the throttle valve 29. To start operation of the driven shaft B, the control lever 75 is set to determine the direction in which the shaft B is to be operated, and the operating member 100 of the throttle valve is depressed so that fluid under pressure is admitted to the cylinder 84 to act on the piston 83 and thus cause tilting of the carrier 38 of the unit 25. When the carrier 38 is thus tilted, the unit 25 immediately delivers fluid under pressure to the unit 26, causing operation of the unit 26 so that the shaft B is rotated. Any desired speed ratio between the shafts A and B can be maintined through suitable operation of the throttle operating member 100. When the hydraulic drive has operated to bring the speed of the shaft B up to that of the shaft A, or in other words, when the carrier 38 of the unit 25 has reached its maximum tilted position, the lug 110 releases the arm 111, allowing the clutch C to close and thus directly connect the shafts A and B so that the drive is through the clutch C. When the direct drive has thus been established through the clutch C, the hydraulic units 25 and 26 return to their unactuated positions and rotate bodily without operation of the pistons except for the slight operation of the pistons 34 above referred to. To disconnect the drive between the shafts A and B, the throttle control 100, being released and returned to the unactuated position through the spring 102, the clutch pedal 19 is depressed, allowing the lug 110 to engage under the arm 111 so that the drive between the shafts A and B is completely disconnected.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A power transmission including a drive element, a driven element, a variable speed hydraulic drive means between said elements and including a tilting member, a mechanical clutch between the elements, and a mechanical control connecting the hydraulic drive and clutch so that the clutch is engaged upon a predetermined drive relation being obtained between said elements through the hydraulic drive, the control being actuated from the tilting element.

2. A power transmission including a drive element, a driven element, a variable speed reversible hydraulic drive means between said elements, manually controlled power means for controlling the hydraulic drive means, a clutch between the elements, and control means acting to automatically engage the clutch upon a predetermined drive relation being obtained between said elements through the hydraulic drive.

3. A power transmission including a drive element, a driven element, a variable speed hydraulic drive means between said elements, control means for the hydraulic drive means including a fluid pressure actuated control mechanism and a manually operable throttle valve controlling the operation of said mechanism, a clutch between the elements, and automatic control means acting to engage the clutch upon a predetermined drive relation being obtained between said elements through the hydraulic drive.

4. A power transmission including a drive element, a driven element, a variable speed hydraulic drive means between said elements, manually controlled means for controlling the hydraulic drive means including a cylinder and piston mechanism operable by pressure from the hydraulic drive means, a clutch between the elements, and automatic control means acting to engage the clutch upon a predetermined drive relation being obtained between said elements through the hydraulic drive.

5. A power transmission including a drive element, a driven element, a variable speed hydraulic drive means between said elements, manually controlled means for controlling the hydraulic drive means including a cylinder and piston mechanism operable by pressure from the hydraulic drive means and a throttle valve for controlling operation of said mechanism, a clutch between the elements, and automatic control means acting to engage the clutch upon a predetermined drive relation being obtained between said elements through the hydraulic drive.

6. A power transmission including a drive element, a driven element, a variable speed reversible hydraulic drive means between said elements, control means for the hydraulic drive including a manually controlled power reverse, a clutch between the elements, and control means acting to engage the clutch upon a predetermined drive relation being obtained between said elements through the hydraulic drive.

7. A power transmission including a drive element, a driven element, a variable speed reversible hydraulic drive means between said elements, control means for the hydraulic drive including a fluid pressure actuated mechanism for reversing and regulating the hydraulic drive, manual means for controlling the direction of operation of the mechanism, and a throttle valve controlling pressure to the mechanism, a clutch between the elements, and automatic control means acting to engage the clutch upon a predetermined drive relation being obtained between said elements through the hydraulic drive.

8. A power transmission including a drive element, a driven element, a variable speed reversible hydraulic drive means between said elements, control means for the hydraulic drive including a fluid pressure actuated mechanism for reversing and regulating the hydraulic drive and operable by pressure from the hydraulic drive means, manual means for controlling the direction of operation of the mechanism, and a throttle valve controlling pressure to the mechanism, a clutch between the elements, and automatic control means acting to engage the clutch upon a predetermined drive relation being obtained between said elements through the hydraulic drive.

9. A power transmission including a drive element, a driven element, a variable speed hydraulic drive means between said elements, a clutch between the elements, and control means acting to engage the clutch upon a predetermined drive relation being obtained between said elements through the hydraulic drive, the hydraulic drive means including a tiltable drive ring operated by the drive shaft, cylinder and piston pressure generating means operated by the drive ring, a driven ring on the driven shaft, and cylinder and piston means operated by pressure from the pressure generating means and operatively connected with the driven ring.

10. A power transmission including a drive element, a driven element, a variable speed hydraulic drive means between said elements, a clutch between the elements, and control means acting to engage the clutch upon a predetermined drive relation being obtained between said elements through the hydraulic drive, the hydraulic drive means including a drive ring carried on the drive shaft, control means for the drive ring operable to tilt it various amounts in either direction from a normal position, cylinder and piston pressure generating means operated by the drive ring, a driven ring having a fixed tilted operating position, and cylinder and piston means operated by pressure from the pressure generating means and operatively connected with the driven ring.

11. A power transmission including a drive element, a driven element, a variable speed hydraulic drive means between said elements, a clutch between the elements, and means acting to engage the clutch upon a predetermined drive relation being obtained between said elements through the hydraulic drive, the hydraulic drive means including a drive ring carried on the drive shaft, control means for the drive ring operable to tilt it various amounts in either direction from a normal position, cylinder and piston pressure generating means operated by the drive ring, a driven ring having a fixed tilted operating position, and cylinder and piston means operated by pressure from the pressure generating means and operatively connected with the driven ring, the control means being actuated by pressure from the pressure generating means.

12. A power transmission including a drive element, a driven element, a variable speed hydraulic drive means between said elements, a clutch between the elements, and control means acting to engage the clutch upon a predetermined drive relation being obtained between said elements through the hydraulic drive, the hydraulic drive means including a drive ring carried on the drive shaft, control means for the drive ring operable to tilt it various amounts in either direction from a normal position, cylinder and piston pressure generating means operated by the drive ring, a driven ring having a definite tilted operating position and being movable to an idling position, fluid pressure actuated means for operating the driven ring to the operating position, and cylinder and piston means operated by pressure from the pressure generating means and operatively connected with the driven ring.

13. A power transmission including a drive element, a driven element, a variable speed hydraulic drive means between said elements, a clutch between the elements, and means acting to engage the clutch upon a predetermined drive relation being obtained between said elements through the hydraulic drive, the hydraulic drive means including a drive ring carried on the drive shaft, control means for the drive ring operable to tilt it various amounts in either direction from a normal position, cylinder and piston pressure generating means operated by the drive ring, a driven ring having a fixed tilted operating position, and cylinder and piston means operated by pressure from the pressure generating means and operatively connected with the driven ring, the control means including pressure actuated cylinder and piston mechanism operated by pressure from the pressure generating means, manual control means for controlling the direction of operation of the mechanism, and a throttle valve controlling pressure admitted to the mechanism.

14. A power transmission including, a drive element, a driven element, a variable speed drive means between the said elements including a tiltable drive ring and cylinder and piston means driven by the ring, a clutch between said elements, and control means for automatically engaging the clutch upon a predetermined drive being obtained between said elements through the variable speed drive, said means including an operating arm connected to the clutch and a part on the drive ring adapted to actuate the arm upon the ring reaching a predetermined position.

15. A power transmission including a drive element, a driven element, a variable speed hydraulic drive means between said elements including, a drive ring carried on the drive shaft, control means for the drive ring operable to tilt it various amounts in either direction from a normal position, cylinder and piston pressure generating means operated by the drive ring, a piston and cylinder driving unit actuated by the pressure generated means, and a clutch between said elements, and control means for automatically engaging the clutch upon a predetermined drive relation being obtained between the said elements through the hydraulic drive, said means including an operating arm on the clutch, and a part on the drive ring normally supporting the arm adapted to release the arm when the ring is in a predetermined tilted position.

In witness that I claim the foregoing I have hereunto subscribed my name this 12th day of May, 1927.

CLARENCE S. SORENSEN.